United States Patent
Tobias (10) Patent No.: US 11,788,970 B2
(45) Date of Patent: Oct. 17, 2023

(54) PROBING FILM THAT ABSORBS AND REACTS WITH GASES, WITH TRANSMITTED LIGHT FOR HIGHER GAS SENSITIVITY

(71) Applicant: Honeywell International Inc., Morris Plains, NJ (US)

(72) Inventor: Peter Tobias, Minneapolis, MN (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 186 days.

(21) Appl. No.: 16/074,868

(22) PCT Filed: Feb. 10, 2017

(86) PCT No.: PCT/US2017/017361
§ 371 (c)(1),
(2) Date: Aug. 2, 2018

(87) PCT Pub. No.: WO2017/139568
PCT Pub. Date: Aug. 17, 2017

(65) Prior Publication Data
US 2019/0041339 A1   Feb. 7, 2019

Related U.S. Application Data

(60) Provisional application No. 62/294,200, filed on Feb. 11, 2016.

(51) Int. Cl.
*G01N 21/78* (2006.01)
*G01N 21/84* (2006.01)
(Continued)

(52) U.S. Cl.
CPC ......... *G01N 21/783* (2013.01); *G01N 21/80* (2013.01); *G01N 21/8483* (2013.01); *G01N 31/221* (2013.01); *G01N 2201/0627* (2013.01)

(58) Field of Classification Search
CPC .... G01N 21/783; G01N 31/221; G01N 21/80; G01N 21/8483; G01N 2201/0627
See application file for complete search history.

(56) References Cited

U.S. PATENT DOCUMENTS 2,800,397 A     7/1957   Offutt et al.
3,827,808 A *   8/1974   Cho ..................... G01N 33/346
                                                     356/429
(Continued)

FOREIGN PATENT DOCUMENTS

CN   101416046 A   4/2009
CN   102636442 A   8/2012
(Continued)

OTHER PUBLICATIONS

International Application No. PCT/US2017/017361, Written Opinion of the International Searching Authority, dated May 24, 2017, 7 pages.
(Continued)

*Primary Examiner* — Elizabeth A Robinson
*Assistant Examiner* — Jean Caraballo-Leon
(74) *Attorney, Agent, or Firm* — ALSTON & BIRD LLP (57) ABSTRACT

Disclosed are methods and systems for detecting a target gas, which involve a configuration of a light source (120) and paper tape (110) such that light (112) emitted from the light source (120) can transmit through the paper tape (110). At least some of the portion of light (112) which transmits through a paper tape (110) can be detected with a detector (130). Detection of the light (112) can be used to determine presence or absence of low concentrations of the target gas.

19 Claims, 6 Drawing Sheets

(51) Int. Cl.
  *G01N 31/22* (2006.01)
  *G01N 21/80* (2006.01)

(56) References Cited

U.S. PATENT DOCUMENTS

| | | | |
|---|---|---|---|
| 4,181,699 | A | 1/1980 | Kitzinger |
| 5,091,642 | A | 2/1992 | Chow et al. |
| 5,239,175 | A | 8/1993 | Jawad et al. |
| 5,397,538 | A | 3/1995 | Stark et al. |
| 6,406,669 | B1 | 6/2002 | Duan et al. |
| 7,504,958 | B1 | 3/2009 | Genovese et al. |
| 7,996,159 | B2 | 8/2011 | Mottier |
| 8,836,520 | B1 | 9/2014 | Crook |
| 2002/0148948 | A1 | 10/2002 | Hensel |
| 2007/0188425 | A1* | 8/2007 | Saccomanno .......... H05B 45/48 345/82 |
| 2007/0243107 | A1 | 10/2007 | Chase et al. |
| 2008/0259341 | A1 | 10/2008 | Short et al. |
| 2009/0111191 | A1* | 4/2009 | Bonne ................ G01N 21/8483 436/164 |
| 2010/0277740 | A1 | 11/2010 | Hulteen et al. |
| 2012/0019815 | A1* | 1/2012 | Horikoshi .......... G01B 11/0691 356/217 |
| 2012/0063956 | A1 | 3/2012 | Truex et al. |
| 2012/0202294 | A1 | 8/2012 | Jin |
| 2012/0304729 | A1* | 12/2012 | O'Dell ................. G01N 21/783 73/1.02 |
| 2013/0010288 | A1 | 1/2013 | Dwyer et al. |
| 2013/0071290 | A1 | 3/2013 | Oum et al. |
| 2013/0186279 | A1* | 7/2013 | Dwyer ..................... A62B 7/10 96/418 |
| 2013/0229658 | A1 | 9/2013 | Jouanique-Dubuis et al. |
| 2013/0236980 | A1 | 9/2013 | Moretti et al. |
| 2013/0259749 | A1 | 10/2013 | Moretti et al. |
| 2014/0036270 | A1 | 2/2014 | Hulteen et al. |
| 2015/0103346 | A1 | 4/2015 | Erdtmann |
| 2015/0362476 | A1 | 12/2015 | Clements et al. |
| 2015/0367149 | A1 | 12/2015 | Greenawald et al. |
| 2017/0030874 | A1 | 2/2017 | Harrison et al. |
| 2017/0248514 | A1 | 8/2017 | Pavey et al. |
| 2020/0003697 | A1 | 1/2020 | Nakamura et al. |
| 2020/0124539 | A1 | 4/2020 | Tobias et al. |

FOREIGN PATENT DOCUMENTS

| | | | |
|---|---|---|---|
| CN | 102834711 | A | 12/2012 |
| CN | 103189736 | A | 7/2013 |
| CN | 203385442 | U | 1/2014 |
| CN | 104736989 | A | 6/2015 |
| DE | 3526495 | A1 | 2/1986 |
| EP | 0477300 | A1 | 4/1992 |
| EP | 0733901 | A2 | 9/1996 |
| EP | 1043583 | A2 | 10/2000 |
| EP | 2487482 | A1 | 8/2012 |
| GB | 1100810 | A | 1/1968 |
| IN | 31/2007 | | 3/2007 |
| JP | H075110 | A | 1/1995 |
| JP | 2008241311 | A | 10/2008 |
| JP | 5327965 | B2 | 10/2013 |
| KR | 10-2012-0000102 | A | 1/2012 |
| WO | 9812542 | A1 | 3/1998 |
| WO | WO-2006016623 | A1 * | 2/2006 ......... A61B 17/2202 |
| WO | 2010117599 | A2 | 10/2010 |
| WO | 2011123403 | A1 | 10/2011 |
| WO | 2015/085186 | A1 | 6/2015 |
| WO | 2017139523 | A1 | 8/2017 |
| WO | 2017139568 | A1 | 8/2017 |
| WO | 2017139584 | A1 | 8/2017 |

OTHER PUBLICATIONS

International Application No. PCT/US2017/017382, International Search Report, dated May 24, 2017, 4 pages.
International Application No. PCT/US2017/017382, Written Opinion of the International Searching Authority, dated May 24, 2017, 7 pages.
Xiong et al., "Amperometric Gas detection: A review", International Journal of Electrochemical Science, vol. 9., Sep. 29, 2014, pp. 7152-7181.
Micronas GAS 86xyB—Digital Gas Sensor Platform, Jul. 2013, 8 pages.
International Application No. PCT/US2017/017288, International Search Report, dated Apr. 24, 2017, 4 pages.
International Application No. PCT/US2017/017288, Written Opinion of the International Searching Authority, dated May 24, 2017, 7 pages.
International Application No. PCT/US2017/017361, International Search Report, dated May 24, 2017, 4 pages.
International Application No. PCT/US2017/017382, International Preliminary Report on Patentability, dated Aug. 14, 2018, 8 pages.
International Application No. PCT/US2017/017288, International Preliminary Report on Patentability, dated Aug. 14, 2018, 8 pages.
International Application No. PCT/US2017/017361, International Preliminary Report on Patentability, dated Aug. 14, 2018, 8 pages.
U.S. Appl. No. 16/074,847, filed Aug. 2, 2018, 39 pages.
U.S. Appl. No. 16/074,860, filed Aug. 2, 2018, 41 pages.
Annex to the communication dated Jun. 30, 2020 for EP Application No. 17707448, 5 pages.
Communication from the Examining Division pursuant to Article 94(c) EPC, dated Jun. 30, 2020 for EP Application No. 17707448, 7 pages.
Communication from the Examining Division pursuant to Rules 161(1) and 162 EPC, dated Oct. 10, 2018 for EP Application No. 17707449, 3 pages.
United States Non-Final Rejection dated Jul. 8, 2020 for U.S. Appl. No. 16/074,847, 12 pages.
Non-Final Office Action received for U.S. Appl. No. 16/074,860, dated Jul. 10, 2020.
CN Office Action dated Aug. 28, 2020 for CN Application No. 201780022771.
CN Search report dated Aug. 21, 2020 for CN Application No. 201780022771.
English Translation of CN Office Action dated Aug. 28, 2020 for CN Application No. 201780022771.
Non-Final Rejection dated Feb. 12, 2021 for U.S. Appl. No. 16/074,860.
English Translation of KR Office Action dated Jan. 29, 2021 for KR Application No. 10-2018-7026216, 2 pages.
KR Office Action dated Jan. 29, 2021 for KR Application No. 10-2018-7026216, 3 pages.
Non-Final Rejection dated Feb. 25, 2021 for U.S. Appl. No. 16/074,847.
Communication about intention to grant a European patent received for European Application No. 17707448.1, dated Jul. 1, 2021, 6 pages.
CN Notice of Allowance dated May 6, 2021 for CN Application No. 201780022771, 2 pages.
English translation of CN Notice of Allowance dated May 6, 2021 for CN Application No. 201780022771, 3 pages.
English translation of KR Notice of Allowance dated Jun. 14, 2021 for KR Application No. 10-2018-7026216, 2 pages.
KR Notice of Allowance dated Jun. 14, 2021 for KR Application No. 10-2018-7026216, 2 pages.
Notification of Grant of Patent Right issued in Chinese Application No. 201780022771.2 dated May 6, 2021, 1 page.
Final Rejection dated Aug. 30, 2021 for U.S. Appl. No. 16/074,860, 39 pages.
Non-Final Office Action received for U.S. Appl. No. 16/074,860, dated Dec. 22, 2021, 17 pages.
Communication from the Examining Division pursuant to Article 94(3) EPC dated Sep. 22, 2021 for EP Application No. 17707449, 7 pages.
Decision to grant a European patent dated Nov. 5, 2021 for EP Application No. 17707448, 2 pages.
Final Office Action received for U.S. Appl. No. 16/074,847, dated Dec. 7, 2021, 50 pages.

(56) References Cited

OTHER PUBLICATIONS

Interview Summary received for U.S. Appl. No. 16/074,860, dated Dec. 2, 2021, 5 pages.
Advisory Action, including Examiner-Initiated Interview Summary and AFCP 2.0 Decision, dated Mar. 15, 2022, for U.S. Appl. No. 16/074,847, 14 pages.
Advisory Action, including Examiner Initated Interview Summary, received for U.S. Appl. No. 16/074,847, dated Mar. 15, 2022, 4 pages.
Non-Final Office Action received for U.S. Appl. No. 16/074,847, dated Sep. 15, 2022, 14 pages.
Advisory Action, including Examiner's Nov. 4, 2022 Interview Summary, received for U.S. Appl. No. 16/074,860, dated Nov. 14, 2022.
Examiner's Oct. 26, 2022 Interview Summary received for U.S. Appl. No. 16/074,860, dated Nov. 1, 2022.
Extended European search report dated Jul. 18, 2022 for EP Application No. 21201238, 8 pages.
Final Office Action received for U.S. Appl. No. 16/074,860, dated Aug. 1, 2022, 16 pages.
CN Office Action, including Search Report dated Jun. 3, 2023 for CN Application No. 202110824200, 9 page(s).
English Translation of CN Office Action dated Jun. 3, 2023 for CN Application No. 202110824200, 1 page(s). Summary only.
Final Rejection dated Apr. 21, 2023 for U.S. Appl. No. 16/074,847, 13 page(s).
Non-Final Rejection dated Apr. 26, 2023 for U.S. Appl. No. 16/074,860, 15 page(s).

* cited by examiner

PROBING FILM THAT ABSORBS AND REACTS WITH GASES, WITH TRANSMITTED LIGHT FOR HIGHER GAS SENSITIVITY

CROSS REFERENCE TO RELATED APPLICATIONS

The present application claims priority to U.S. Provisional Patent Application No. 62/294,200 filed Feb. 11, 2016, and entitled "Probing Film that Absorbs and Reacts with Gases, with Transmitted Light for Higher Gas Sensitivity," which is incorporated herein by reference as if reproduced in its entirety.

BACKGROUND

Gas detectors can be configured to detect one or more gases for the purpose of monitoring the concentration and/or maintaining a threshold level of one or more gases in an environment. In some instances, gas detectors include a film impregnated with one or more chemicals which react with a gas being detected. The film darkens and/or stains when contacted by the gas being detected. A challenge with these types of gas detectors is the detection of low concentrations of gases. For example, while even small amounts of arsine ($AsH_3$) and ammonia ($NH_3$) can be toxic, the degree of film darkening and/or staining can be low enough that small amounts cannot be reliably detected.

SUMMARY

Disclosed herein are methods for detecting a target gas. For example, the method can comprise contacting a gas stream with a paper tape, emitting light from a light source, and detecting at least some of a portion of the light which transmits through the paper tape.

Also disclosed herein are systems for detecting a target gas. For example, the system can comprise a paper tape, a light source configured to emit light such that a first part of the light enters a side of the paper tape, and a first detector configured to detect at least some of a portion of the first part of the light which transmits through the paper tape and exits an opposite side of the paper tape.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is a graph of reflection/transmission remaining for Leader tape having different stain levels. FIG. 5 also shows the performance for detected light in reflection (Avago) as well as the detected light in transmission (Red, Green, and Blue).

FIG. 6 is a graph of reflection/transmission remaining for MA tape having different stain levels when exposed to HCl as the target gas. FIG. 6 shows the performance for detected light in reflection (Avago) as well as the detected light in transmission (Red, Green, and Blue).

FIG. 7 is a graph of reflection/transmission remaining for paper tape having different stain levels when exposed to $PH_3$ as the target gas and when exposed to $AsH_3$ as the target gas. FIG. 7 shows the performance for detected light in reflection (Avago) as well as the detected light in transmission (Green).

FIG. 8 is a graph of reflection/transmission remaining for paper tape having different stain levels when exposed to 50 ppb of $AsH_3$ as the target gas in the gas stream tested. FIG. 8 shows the performance for detected light in reflection (Avago) as well as the detected light in transmission (Red, Green, and Blue).

FIG. 9 is a graph showing the color ratios for light detected from reflection off hydride paper for various stain levels, for each of $PH_3$ and $AsH_3$. FIG. 9 also shows the performance for detected light in transmission as the ratio of Blue/Green and the ratio of Red/Green.

FIG. 10 is a graph showing the color ratios for light detected from reflection off hydride paper for various stain levels, for each of $PH_3$ and $AsH_3$. FIG. 9 also shows the performance for detected light in transmission as the ratio of Blue/Green and the ratio of Red/Green.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include gas detector configurations and gas detection methods which contact a gas stream with a paper tape, emit light from a light source, transmit at least a portion of the light through the paper tape, and detect at least some of the portion of the light which transmits through the paper tape. The disclosed embodiments can detect amounts of target gases which are not detectable or inadequately detectable (e.g., susceptible to false positives) through detecting reflected light. Thus, the disclosed embodiments allow for: i) identifying low concentrations of a target gas in a gas stream, and ii) identifying a target gas that does not stain well (e.g., does not create strong stains) in or on the paper tape.

In embodiments, the gas stream can be air, and a target gas in the air can be one or more of hydrogen sulfide ($H_2S$), hydrogen selenide ($H_2Se$), diborane ($B_2H_6$), germane ($GeH_4$), silane ($SiH_4$), phosphine ($PH_3$), arsine ($AsH_3$), ammonia ($NH_3$), or a combination thereof.

Figure 1:
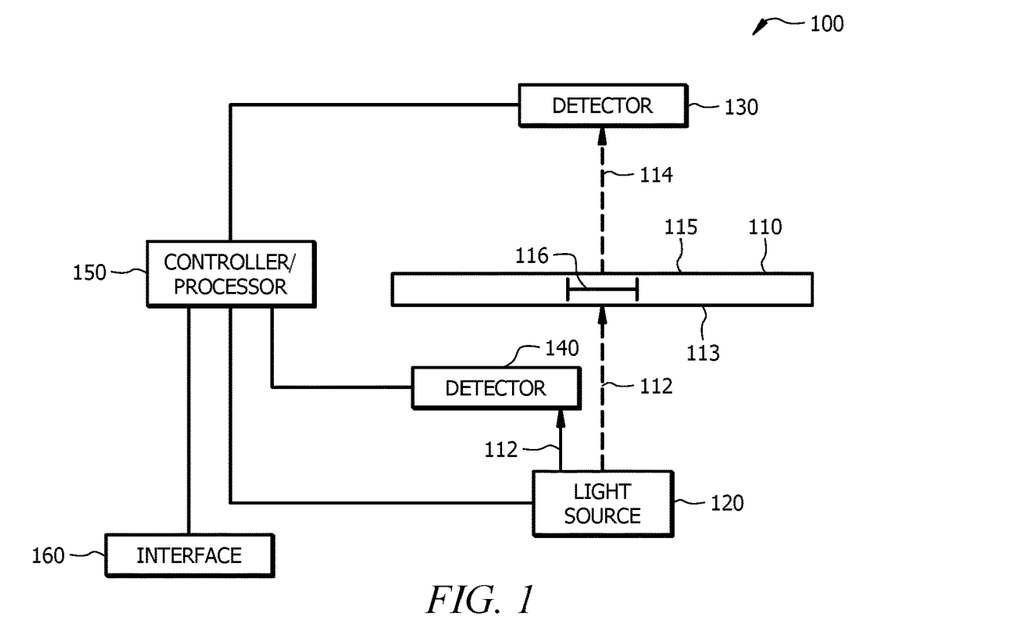
FIG. 1 illustrates a gas detection system in accordance with the disclosure.

Referring now to FIG. 1, a first embodiment of a gas detection system 100 according to the disclosure is shown. The system 100 may be referred to as a toxic gas analyzer cassette. The system 100 includes a paper tape 110, a light source 120 configured to emit light 112, and a detector 130 configured to detect at least some of the portion 114 of light 112 which transmits through the paper tape 110. The system 100 can optionally include a second detector 140 configured to detect the emitted light 112 before transmission through the paper tape 110 to ensure the light source 120 is functioning properly (e.g., an intensity of light is consistent, appropriate wavelengths are being emitted, intensity and/or wavelength(s) are at a threshold value, intensity and/or wavelength(s) are above a threshold value, or a combination thereof). As can be seen, in FIG. 1, the system 100 may further optionally include a controller/processor 150 and an interface 160. The controller/processor 150 may be connected to the light source 120, the detector 130, the second detector 140, the interface 160 or a combination thereof. The controller/processor 150, the interface 160, or both may be connected with an alarm (not shown) which is activated upon identifying a target gas above a threshold concentration value.

The paper tape 110 is a chemically treated paper that reacts with a target gas which comes into contact with the paper tape 110 via flow of gas stream containing the target gas over the paper tape 110, through the paper tape 110, or both over and through the paper tape 110. The chemical treatment may be an impregnation of the paper tape with one or more chemicals. The paper tape 110 may also be referred to as a film. In embodiments, flow of the gas stream is focused to a region 116 of the paper tape. The paper tape 110 reacts with a target gas when contacted with the target gas, and the reaction forms a stain on the paper tape 110 (the stain being the reaction product produced by contact of the target gas with the paper tape 110). The stain produced by contact of the target gas with the paper tape 110 can be a color depending on the target gas and the chemical used to chemically treat the paper to yield the paper tape 110. Moreover, the stain can have a particular strength, e.g., light, medium, or dark. A particular paper tape 110 may yield stains for one or more target gases while not yielding stains for other gases, depending on the chemical treatment. An unstained paper tape 110 can be referred to as being in a "white" state. Staining of the paper tape 110 generally transforms the paper tape 110 from a white state to a stained state, indicating the presence of one or more target gases in the gas stream.

Embodiments of the light source 120 generally include one or more LEDs. The one or more LEDs are of at least two colors (e.g., at least two wavelengths of light). In an embodiment, the one or more LEDs include LEDs which emit light which includes red, green, blue, ultra-violet, infrared, or a combination thereof. The one or more LEDs may be selected from i) a single LED which emits a combination of wavelengths of light (e.g., a combination of red, green, and blue (RGB) wavelengths of light), ii) multiple LEDs, each of which emits a combination of wavelengths of light (e.g., each of which emits red, green, and blue (RGB) wavelengths of light), iii) multiple LEDs, each of which emits a single wavelength of light (e.g., each LED emits one of green, red, blue, ultraviolet, or infrared), or iv) a combination of i), ii), and iii). Moreover, the one or more LEDs can be multiple LEDs of a single wavelength in combination with one or more LEDs of other wavelengths. For example, the light source 120 can include seven LEDs of blue wavelength, one LED of red wavelength, and three LEDs of green wavelength; or by way of example only, the light source 120 can include five ultraviolet LEDs and two LEDs which emit a combination of RGB wavelengths.

Examples of LEDs which emit red, green, and blue wavelengths of light are a RGB-LED from Thorlabs® (part number LEDRGBE) and a SMD-LED from Bivar (part number SMP4-RBG).

Figure 4:
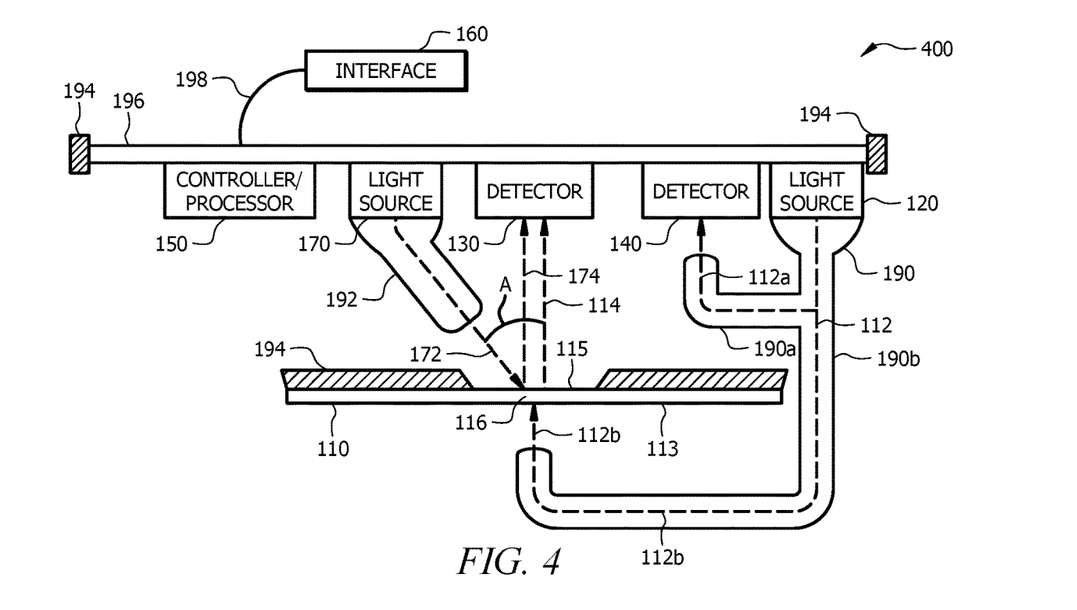
FIG. 4 illustrates a manufacturing configuration of the gas detection system of FIG. 2.

The system 100 is configured such that the light emitted from the light source 120 travels to or is directed to (e.g., via a light pipe as shown in FIG. 4) a region 116 of the paper tape 110 for transmission through the paper tape 110 from one side (e.g., also referred to as the entry side) 113 of the paper tape 110 to another side (e.g., also referred to as the opposite side, transmission side, or exit side) 115 of the paper tape 110. The portion of the light which is detected by the detector 130 on the transmission side 115 of the paper tape 110 can be less than 50% (e.g., about 20%) of the light which entered the paper tape 110 on the entry side 113 of the paper tape 110. Transmission of light from the light source 120 is used because a smaller portion of the light transmits through the paper tape 110 when stains or spots (weak, strong, or both weak and strong) are present in the region 116 of the paper tape 110, as compared with the portion of light (e.g., about 50%) which is detected by reflection of light off of the paper tape 110. The lower transmission of the transmitted light affords for a higher sensitivity of detection of stains or spots for target gases which are present in low concentrations in the gas stream or yield a weak stain or spot via reaction with the paper tape 110.

Figure 2:
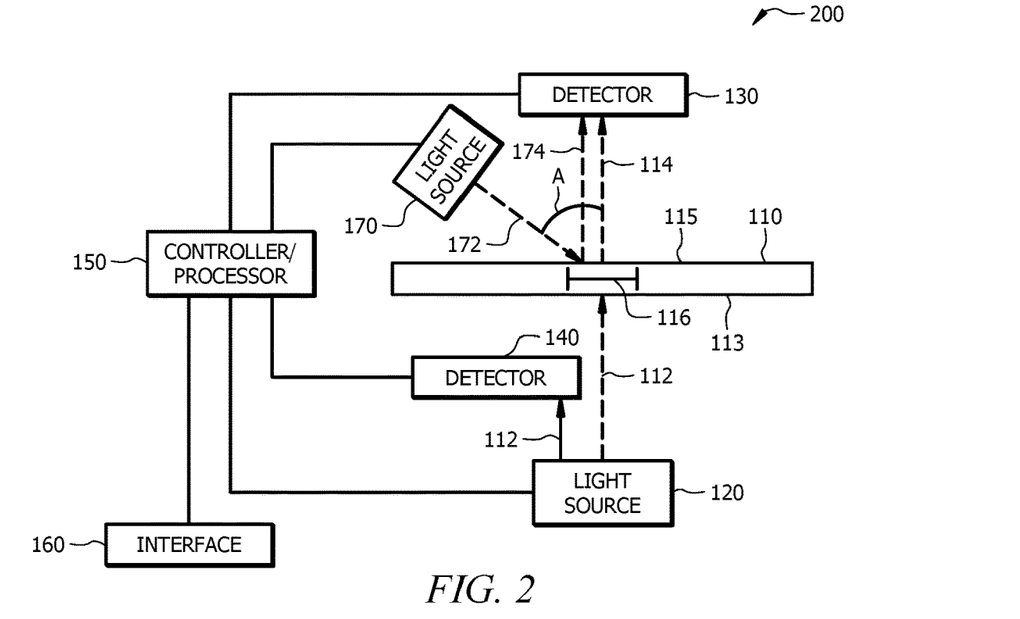
FIG. 2 illustrates another configuration of a gas detection system in accordance with the disclosure.

Detection of reflected light can be used in combination with detection of transmitted light, which is described in detail for FIG. 2.

The detector 130 is any photodetector device known in the art for detecting one or more wavelengths of the light 112 which transmits through the paper tape 110. The detector 130 is positioned on the transmission side 115 of the paper tape 110 so that the detector 130 can detect the portion 114 of light 112 which transmits through the paper tape 110 and reaches the detector 130. The detector 130 may output signals that indicate intensity and/or color (e.g., wavelength) of the portion 114 of light 112 which was transmitted through the paper tape 110, traveled to the detector 130, and was detected by the detector 130. The detector 130 may be connected to a controller/processor 150, which may provide further analysis of the detected light 114.

Detection of the light wavelengths disclosed herein, after transmission through the paper tape 110, provides a higher sensitivity. For example, it has been found that red, green, and blue light, when transmitted through the paper tape 110 (as opposed to reflected) is more sensitive to staining of the paper tape 110.

The detector 140 is any photodetector device known in the art for detecting one or more wavelengths of the light 112 disclosed herein. The detector 140 is positioned relative to the light source 120 such that emitted light 112 is detected by the detector 140. In FIG. 1, the detector 140 is positioned on the entry side 113 of the paper tape 110, as in the light source 120. The detector 140 may output signals that indicate intensity and/or color (e.g., wavelength) of the light 112 which emits from the light source 120. The detector 140 may be connected to a controller/processor 150, which may provide further analysis of the detected light 112.

The controller/processor 150 can provide further analysis of detected light 112, detected light 114, or both detected light 112 and detected light 114. The controller/processor 150 may also control parameters of the light source 120, for example, whether and when the light source 120 turns on and off, the intensity of the light source 120, which portions(s) of the light source 120 are active or inactive, or a combination thereof.

An interface 160 can be connected to the controller/processor 150. In an embodiment, the interface 160 is a MM-interface.

In operation, a gas stream containing one or more gases contacts the paper tape 110 by being directed over or through the paper tape 110, e.g., over or through at least the region 116 of the paper tape 110. The direction of flow of the gas stream can be any direction which allows for contact of any target gases with region 116 of the paper tape 110. Directions of flow include flow on the transmission side 115 of the paper tape 110 and perpendicular to the light 114 (from right to left or from left to right as looking at FIG. 1), flow on the entry side 113 of the paper tape 110 and perpendicular to the light 112 (from left to right or from right to left), flow at any angle (including zero) with respect to light 114 and through the paper tape 110 from the transmission side 115 to the entry side 113 with subsequent flow away from the entry side 113 at any angle (including zero) with respect to light 112, flow at any angle (including zero) with respect to light 112 and through the paper tape 110 from the entry side 113 to the transmission side 115 with subsequent flow away from the transmission side 115 at any angle (including zero) with respect to light 114, or a combination thereof.

At least one target gas in the one or more gases of the gas stream can react with the paper tape 110 and lead to a darkening or staining of the paper tape 110.

The controller/processor 150 controls the light source 120 so as to activate the light source in any manner known in the art. For example, the light source 120 can be activated in light pulses of 1, 2, 3, 4, 5, 6, 7, 8, 9, 10, or more milliseconds (ms). Generally, the light 112 emitted from the light source 120 is directed to the paper tape 110 (e.g., to a particular region 116 of the paper tape 110) by facing the light source 120 to the entry side 113 of the paper tape 110 or by using a light pipe to direct the light to the entry side 113 of the paper tape 110 (see FIG. 4 for an example of use of light pipes). The detector 140 detects the light 112 emitted from the light source 120 and communicates with the controller/processor 150 to determine the light source 120 is functioning properly. The detector 130 detects at least some of the portion 114 of the light 112 which transmits through the region 116 of the paper tape 110. The detector 130 communicates with the controller/processor 150 to identify the target gas or target gases which caused the stains in the paper tape 110. For example, the detector 130 can convert the light signal detected to a digital signal which is communicated to the controller/processor 150, which averages the detected light information from the digital signals, e.g., for ten light pulses per second emitted by the light source 120. In embodiments, the detector 130 communicates with the controller/processor 150 to determine there is no stain and no target gases present in the gas stream.

Referring now to FIG. 2, a second embodiment of a gas detection system 200 according to the disclosure is shown. The system 200 may also be referred to as a toxic gas analyzer cassette. The system 200 can include the components of the system 100 of FIG. 1, including the paper tape 110, the light source 120, the detector 130, the second detector 140, the controller/processor 150, the interface 160, or a combination thereof, with the functionality described in FIG. 1.

The system 200 of FIG. 2 differs from the system 100 of FIG. 1 in that the system 200 of FIG. 2 additionally includes a second light source 170. The second light source 170 is a light source of typical gas analyzer cassettes, for example a white light LED. The controller/processor 150 can be connected to the second light source 170 to control parameters of the light source 170, for example, whether and when the light source 170 is turned on and off, the intensity of the light source 170, or a combination thereof.

The second light source 170 emits light 172, for example, white light at the corresponding wavelengths. A reflected portion 174 of the light 172 reflects off the paper tape 110 and is detected by the detector 130. In system 200, the detector 130 has a dual functionality of being configured to detect the transmitted portion 114 of light 112 and the reflected portion 174 of light 172.

The second light source 170 can be oriented at an angle A with respect to the transmitted portion 114 of light 112. In an embodiment, angle A is about 30°. In other embodiments, angle A can be any angle for detection of reflected light known in the art.

In operation of the system 200, the components operate similarly to the corresponding components of FIG. 1. In system 200, the controller/processor 150 has additional functionality of controlling the light source 170, e.g., to activate the light source 170 in any manner known in the art. For example, the light source 170 can be activated in light pulses of 1, 2, 3, 4, 5, 6, 7, 8, 9, 10, or more ms.

In an embodiment, the light source 170 provides light which is different than the light provided by light source 120. As described herein, the light source 170 may be white light LED, while the light source 120 may include a combination of one or more colors as described for FIG. 1 (e.g., an RBG LED). The controller/processor 150 is operable to control both the light source 120 and light source 170 to operate in cooperation. For example, the light source 170 may operate using about ten short light pulses per second, with each short light pulse having a duration in a range of 1 ms to 2 ms. The time between the short light pulses of the light source 170, referred to herein as "dark time," can be used to operate the light source 120 for transmission of light 112 as described for FIG. 1.

The system 200 of FIG. 2 allows for operation of the light source 170 to detect higher concentrations of target gases and stronger stains through the detection of reflected portion 174 of light 172 in detector 130, in combination with the operation of light source 120 to detect lower concentrations of target gases and weaker stains through the detection of transmitted portion 114 of light 112 in detector 130.

Figure 3:
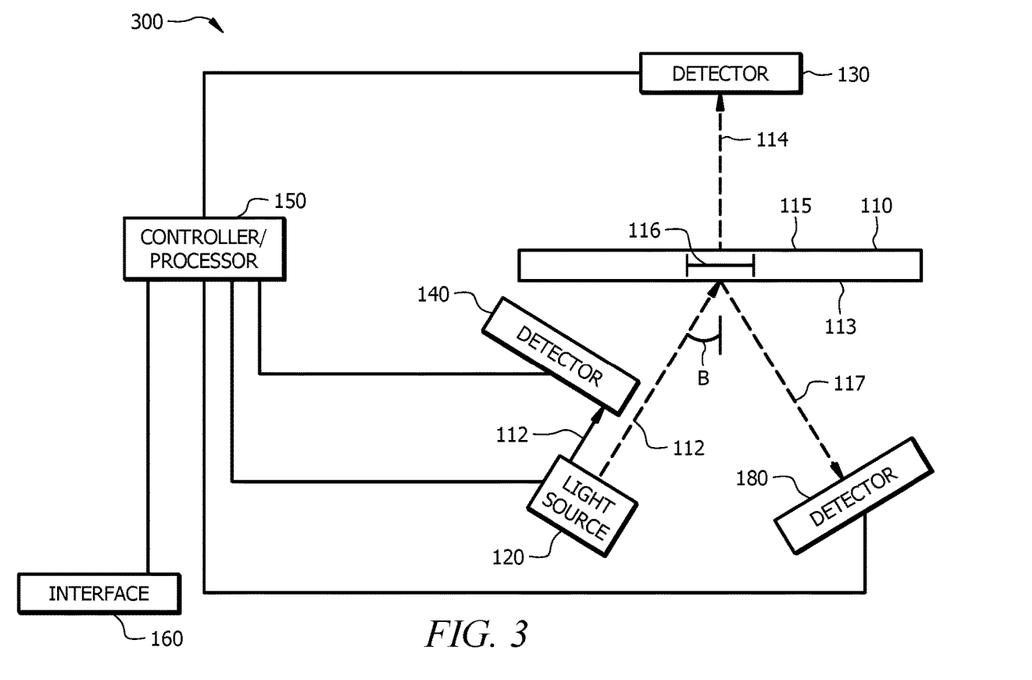
FIG. 3. illustrates another configuration of a gas detection system in accordance with the disclosure.

Referring now to FIG. 3, a third embodiment of a gas detection system 300 according to the disclosure is shown.

The system 300 may also be referred to as a toxic gas analyzer cassette. The system 300 can include the components of the system 100 of FIG. 1, including the paper tape 110, the light source 120, the detector 130, the second detector 140, the controller/processor 150, the interface 160, or a combination thereof, with the functionality described in FIG. 1.

The system 300 of FIG. 3 differs from the system 100 of FIG. 1 in that the system 300 of FIG. 3 additionally includes a third detector 180. The light source 120, the light 112 emitted from the light source 120, or both, are in a different orientation with respect to the entry side 113 of the paper tape 110.

Light source 120 may be positioned such that light 112 emits from the light source 120 at an angle B with respect to perpendicular of the paper tape 110. In an embodiment, angle B is about 30°. In other embodiments, angle B can be any angle for detection of reflected light known in the art.

The system 300 allows for detection of both reflected light 117 and transmitted light 114. While a portion 114 of the light 112 transmits through the paper tape 110 and is detected by detector 130, another portion 117 of light 112 is reflected from the entry side 113 of the paper tape 110 and is detected by the third detector 180. The third detector 180 is configured to detect reflected portion 117 of light 112 for the wavelengths of light 112 disclosed herein.

The system 300 of FIG. 3 allows for operation of a single light source 120 (as compared with the system 200 of FIG. 2) to detect higher concentrations of target gases and stronger stains through the detection of reflected portion 117 of light 112 in detector 180, in combination with the operation of light source 120 to detect lower concentrations of target gases and weaker stains through the detection of transmitted portion 114 of light 112 in detector 130.

Referring now to FIG. 4, a manufacturing embodiment 400 of the gas detection system 200 of FIG. 2 is shown. In the manufacturing embodiment 400, the components of the system 200 are all mounted on a common circuit board 196. The order and arrangement of the components 120, 130, 140, 150, and 170 is not limited to that shown in FIG. 4. Moreover, systems 100 and 300 can likewise be in a manufacturing embodiment with all components mounted on a common circuit board similar to circuit board 196 described for FIG. 4.

The circuit board 196 has circuitry appropriate for connecting the components 120, 130, 140, 150, and 170 as shown and described for FIG. 2. Wiring 198, which is not embedded in the circuit board 196, can connect the controller/processor 150 to the interface 160; alternatively, the interface 160 can be mounted in the circuit board 196 with appropriate connection to the controller/processor 150.

The circuit board 196 and the paper tape 110 are held in place by a housing 194 of the manufacturing embodiment 400. The housing 194 can be made of any material and of any configuration suitable for holding the components for gas detection.

The manufacturing embodiment 400 also includes light pipes 190 and 192 to direct the light emitted from the light source 120 to the detectors 130 and 140 and from the light source 170 to the detector 130. The light pipes 190 and 192 are made of material and manufactured according to techniques known in the art.

The first light pipe 190 is positioned over the light source 120 so as to capture the light 112 emitted from the light source 120. The light pipe 190 includes a first portion 190a and a second portion 190b. Because the second detector 140 is mounted on the circuit board 196, a first portion 112a of the light 112 emitted from the light source 120 is directed by a first portion 190a of the light pipe 190 toward the second detector 140, for determining the light 112 emitted from the light source 120 is adequate and/or the light source 120 is functioning properly. A second portion 112b of the light 112 is directed by the second portion 190b of the light pipe 190 to the entry side 113 of the paper tape 110. The second portion 190b of the light pipe 190 directs the second portion 112b of the light 112 such that the second portion 112b of light 112 enters the paper tape 110 perpendicular with respect to the paper tape 110. A portion 114 of the light 112 transmits through the paper tape 110, and at least some of the portion 114 of light 112 is detected by detector 130, as described in FIG. 2.

The second light pipe 192 is positioned over the light source 170 so as to capture the light 172 emitted from the light source 170. The light pipe 192 directs the light 172 such that light 172 travels at angle A with respect to the transmitted light 114 (angle A is described in detail for FIG. 2).

In combination with any of the embodiments disclosed herein, the flow of the gas stream can be increased to increase sensitivity of the systems and methods disclosed herein for detecting lower concentrations of target gases and target gases which react with the paper tape 110 to yield weaker stains.

The above described systems and methods can include the following embodiments.

In embodiment 1, a method for detecting a target gas can comprise contacting a gas stream with a paper tape; emitting light from a light source; and detecting at least some of a portion of the light which transmits through the paper tape.

Embodiment 2 can include embodiment 1, wherein the gas stream contains a target gas which produces a stain on the paper tape.

Embodiment 3 can include any of embodiments 1 to 2, further comprising: identifying the target gas based on the at least some of the portion of the light which is detected.

Embodiment 4 can include any of embodiments 1 to 3, wherein the light source emits wavelengths of light selected from red, green, blue, ultraviolet, infrared, or a combination thereof.

Embodiment 5 can include any of embodiments 1 to 4, wherein the light enters a side of the paper tape and exits an opposite side of the paper tape.

Embodiment 6 can include any of embodiments 1 to 5, wherein the step of detecting is performed on the opposite side of the paper tape.

Embodiment 7 can include any of embodiments 1 to 6, further comprising detecting at least some of another portion of the light which reflects from the paper tape.

Embodiment 8 can include any of embodiments 1 to 7, wherein the step of detecting is performed on the opposite side of the paper tape.

Embodiment 9 can include any of embodiments 1 to 8, further comprising: emitting a second light from a second light source; and detecting at least some of a portion of the second light which reflects from the paper tape.

Embodiment 10 can include any of embodiments 1 to 9, wherein the step of emitting light from a light source and/or the step of emitting a second light from a second light source comprises activating the light source and/or the second light source in light pulses.

Embodiment 11 can include embodiment 10, wherein each of the light pulses has a duration of at least 1 millisecond (ms).

Embodiment 12 can include any of embodiments 10 to 11, wherein the light source and/or the second light source emits about ten light pulses per second.

Embodiment 13 can be a system for detecting a target gas, the system comprising: a paper tape; a light source configured to emit light such that a first part of the light enters a side of the paper tape; and a first detector configured to detect at least some of a portion of the first part of the light which transmits through the paper tape and exits an opposite side of the paper tape.

Embodiment 14 can include embodiment 13, further comprising: a second detector to detect the light emitted from the light source.

Embodiment 15 can include any of embodiments 13 to 14, further comprising: a controller/processor connected to one or more of the light source, the first detector, and the second detector.

Embodiment 16 can include any of embodiments 13 to 15, wherein any of the light source, the first detector, the second detector, and the controller/processor are optionally mounted on a circuit board.

Embodiment 17 can include any of embodiments 13 to 16, wherein the light source is further configured to emit light such that a second part of the light reflects from the side of the paper tape.

Embodiment 18 can include embodiment 17, the system further comprising: a third detector configured to detect a reflected portion of the second part of the light.

Embodiment 19 can include any of embodiments 13 to 18, further comprising a second light source configured to emit a second light such that the second light reflects from the opposite side of the paper tape and a reflected portion of the second light is detected by the first detector.

Embodiment 20 can include embodiment 13, wherein the light source is further configured to emit light such that a second part of the light reflects from the side of the paper tape.

Embodiment 21 can include embodiment 20, further comprising a second detector configured to detect a reflected portion of the second part of the light.

Embodiment 22 can include any of embodiments 13 to 21, further comprising one or more light pipes which direct the light emitted from the light source to the side of the paper tape.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner.

Examples 1 to 4 illustrate the high sensitivity allowable for detecting light transmitted through the paper tape 110 compared with detecting light reflected from the paper tape 110. In Examples 1 to 4, the detected light in reflection (referred to as Avago) was compared with the detected light which was transmitted through paper tape 110 (referred to as Red, Green, and Blue). A system comparable with system 200 of FIG. 2 was used in Examples 1 to 4.

Figure 5:
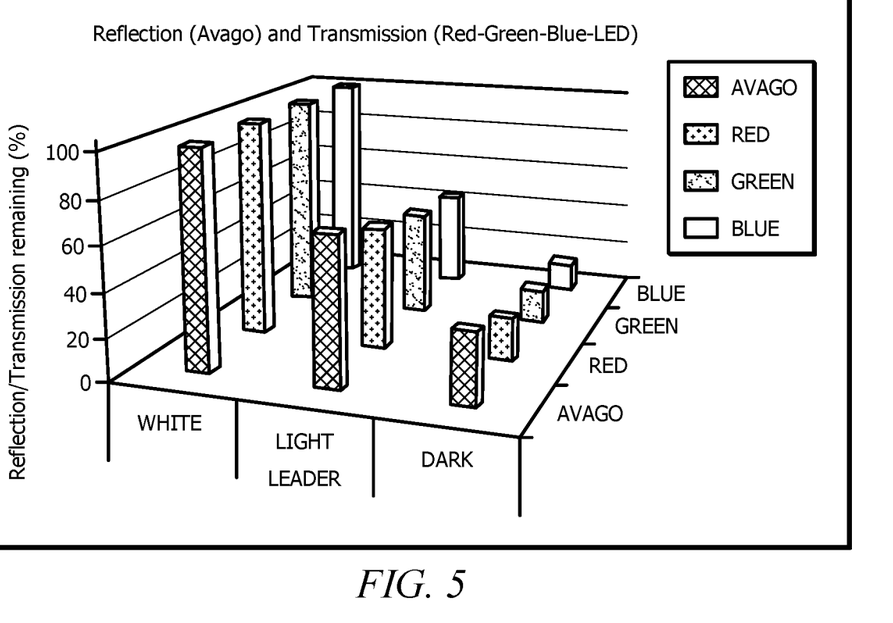

Example 1 tested Leader Tape as the paper tape 110 for unstained, light stain, and dark stain. The results are shown in FIG. 5. FIG. 5 demonstrates that paper tape is suitable for calibrating transmission of red, green, and blue light.

Figure 6:
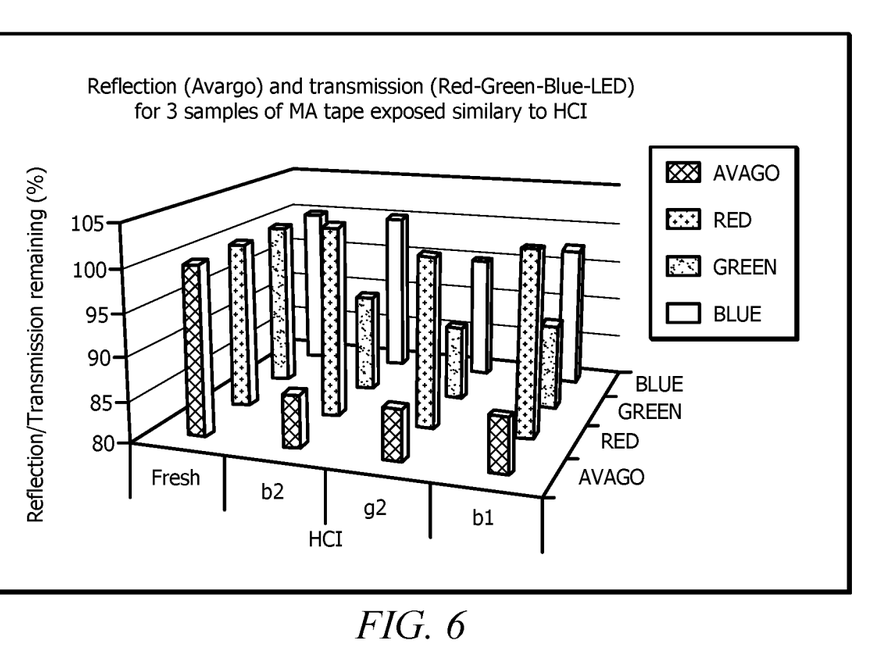

Example 2 detected light for three samples of MA tape which were similarly exposed to HCl as the target gas. The results are shown in FIG. 6. The stains are labeled as fresh (no stain), b2, g2, and b1. FIG. 6 shows for detected light in reflection (Avago) as well as the detected light in transmission (Red, Green, and Blue), HCl seems not to affect the interaction of red light with MA tape.

Figure 7:
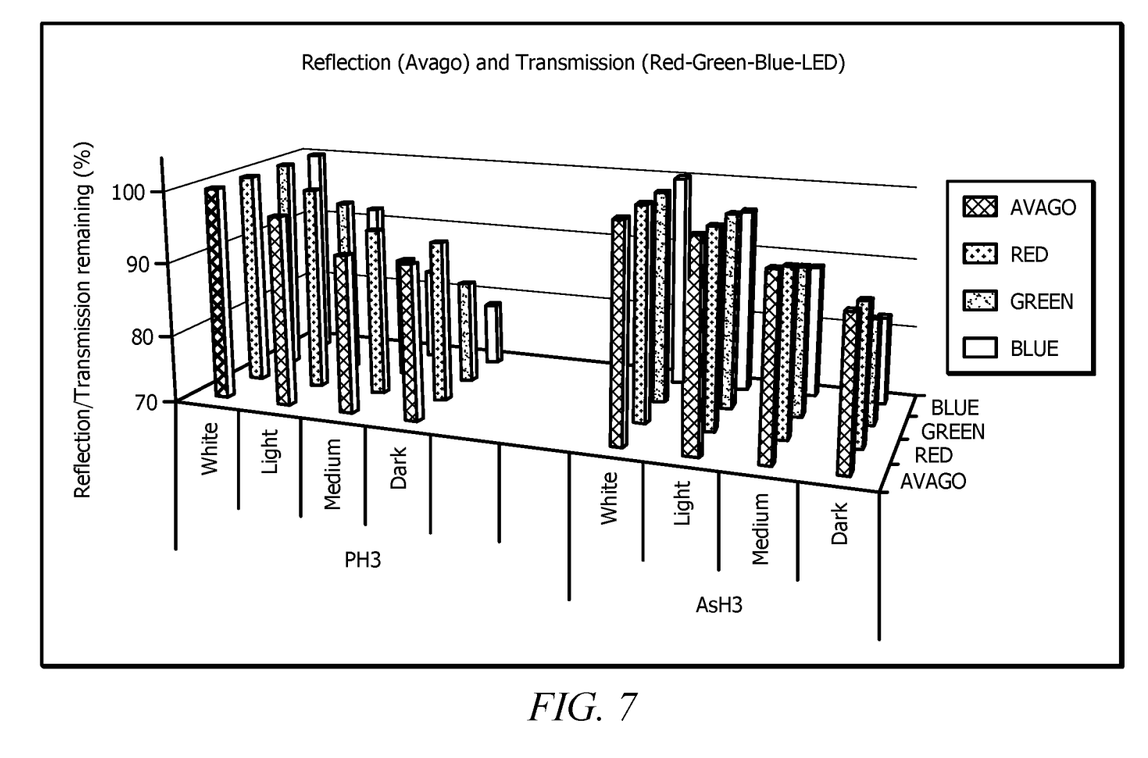

Example 3 compares unstained tape ("white") with light, medium, and dark stains produced by each of $PH_3$ and $AsH_3$. The results are shown in FIG. 7. As can be seen, detection of light transmitted through the paper tape is more sensitive to staining than the detection of reflected light (Avago).

Figure 8:
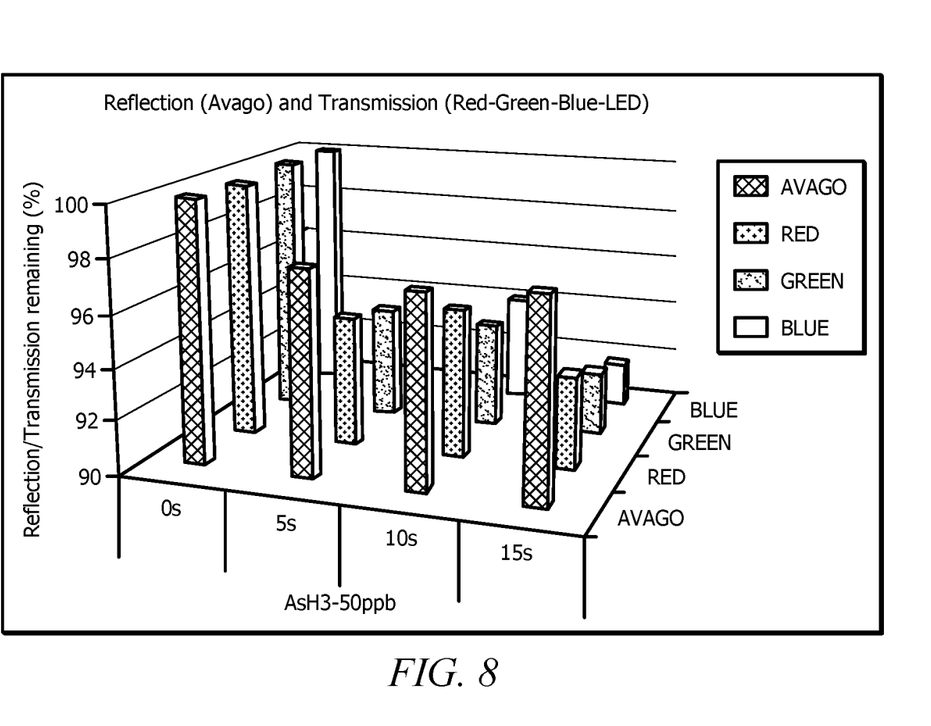

Example 4 tested 50 ppb of $AsH_3$ as the target gas in the gas stream tested. The results are shown in FIG. 8. As can be seen, detection of light transmitted through the paper tape is more sensitive to staining than the detection of reflected light (Avago).

Figure 9:
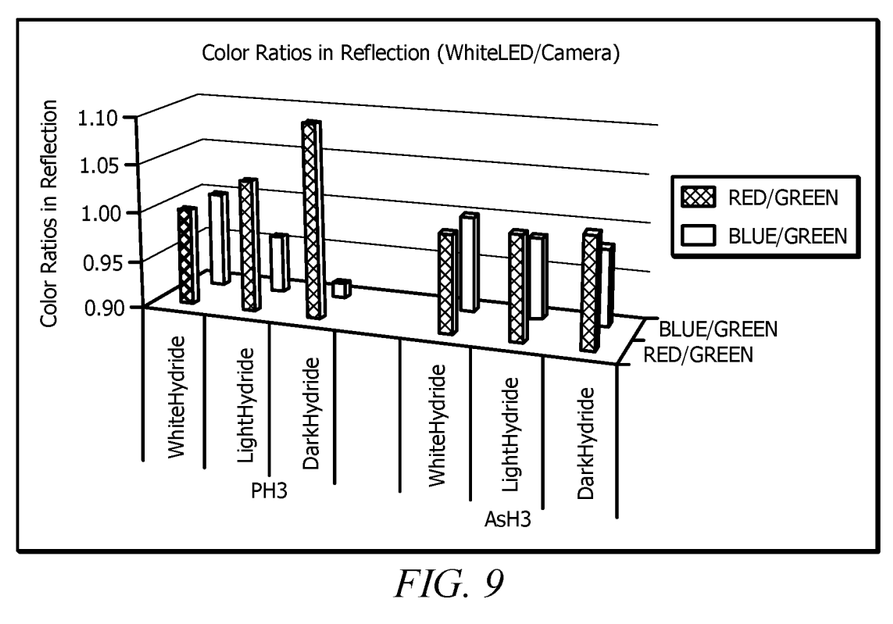
Figure 10:
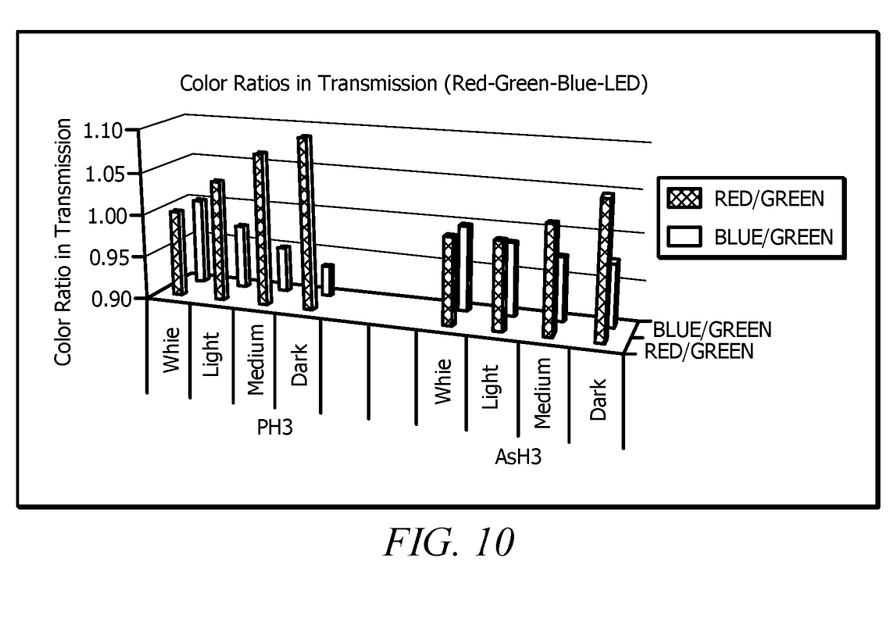

Examples 5 and 6 compared the selectivity of a hydride paper tape for $PH_3$ and $AsH_3$. Example 5 determined the color ratios for light detected from reflection off hydride paper for no stain ("WhiteHydride"), light stain ("LightHydride"), and dark stain ("DarkHydride") for each of $PH_3$ and $AsH_3$. The results of Example 5 are shown in FIG. 9. Example 6 determined the color ratios for light detected from transmission through hydride paper for no stain ("White"), light stain ("Light"), medium stain ("Medium"), and dark stain ("Dark") for each of $PH_3$ and $AsH_3$. The results of Example 5 are shown in FIG. 10. As can be seen, the color ratios seem the same in transmission and reflection, and the $PH_3$ stains have a higher red-to-blue ratio than the $AsH_3$ stains. As for reflection, transmission has been found dependent on the wavelength of the light, and the ratio of transmitted colors can change with the type of gas, as it sometimes does for reflected light, and which leads to differently colored gas stains.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the invention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for detecting a target gas in a gas stream, the method comprising:
   contacting a paper tape with the gas stream comprising the target gas;
   emitting light from a first light source positioned on a first side of the paper tape;
   detecting, by a first detector positioned on the first side of the paper tape, at least a first portion of the light emitted from the first light source that is reflected off a first surface of the paper tape;
   emitting light from a second light source positioned on a second side of the paper tape;
   detecting, by a second detector positioned on the second side of the paper tape, at least a first portion of the light emitted from the second light source before it reaches a second surface of the paper tape;
   detecting, by the first detector, a second portion of the light emitted from the second light source which is transmitted into the second surface of the paper tape and transmits out of the paper tape through the first surface of the paper tape; and
   detecting, by a controller/processor, the target gas in the gas stream based on the detected at least first portion of the light emitted from the first light source, the detected at least first portion of the light emitted from the second light source, and the detected at least second portion of the light emitted from the second light source.

2. The method of claim 1, wherein the gas stream contains the target gas which reacts with the paper tape that is chemically treated and produces a stain on the paper tape when the target gas comes in contact with the paper tape.

3. The method of claim 1, wherein at least one of the first light source or the second light source emits wavelengths of light selected from among: red, green, blue, ultraviolet, or infrared.

4. The method of claim 1, wherein at least one of the first light source or the second light source emits about ten light pulses per second.

5. The method of claim 4, wherein at least one of the first light source or the second light source comprises a white light LED.

6. The method of claim 1, wherein at least one of the first light source or the second light source comprises an RBG LED.

7. A system, the system comprising:
   a paper tape;
   a first light source configured to emit light towards a first side of the paper tape;
   a first detector configured to detect a first portion of the light from the first light source that is reflected from the first side of the paper tape;
   a second light source configured to emit light towards a second side of the paper tape;
   a second detector configured to detect a first portion of the light from the second light source, wherein the first detector and the second detector are on an opposite side of the paper tape; and
   a controller/processor configured to detect a target gas based on the detected at least first portion of the light from the first light source, the at least first portion of the light from the second light source, and the detected at least second portion of the light from the second light source.

8. The system of claim 7, wherein the controller/processor is connected to the first and second light sources, the first detector, and the second detector.

9. The system of claim 8, wherein the first and second light sources, the first detector, the second detector, and the controller/processor are mounted on one or more circuit boards.

10. The system of claim 9, further comprising:
    one or more light pipes which direct the light emitted from the first light source to the first side of the paper tape.

11. The system of claim 7, wherein at least one of the first light source or the second light source comprises a white light LED.

12. The system of claim 7, wherein at least one of the first light source or the second light source comprises an RBG LED.

13. A method comprising:
    contacting a gas stream with a paper tape;
    emitting light from a first light source;
    detecting, by a first detector, at least a first portion of the light emitted from the first light source which reflects from a first side of the paper tape;
    emitting light from a second light source;
    detecting, by a second detector, at least a first portion of the light emitted from the second light source before the light reaches the paper tape;
    detecting, by the first detector, at least a second portion of the light emitted from the second light source which transmits through the paper tape, wherein the first detector and the second detector are on an opposite side of the paper tape; and
    detecting, by a controller/processor, a target gas based on: the detected at least first portion of the light emitted from the first light source after reflectance from the first side of the paper tape, the detected at least first portion of the light emitted from the second light source before the light reaches the paper tape, and the detected at least second portion of the light emitted from the second light source after transmittance through the paper tape.

14. The method of claim 13, wherein the gas stream contains the target gas which reacts with the paper tape that is chemically treated and produces a stain on the paper tape when the target gas comes in contact with the paper tape.

15. The method of claim 13, wherein at least one of the first light source or the second light source emits wavelengths of light selected from among: red, green, blue, ultraviolet, or infrared.

16. The method of claim 13, wherein the light emitted from the second light source enters a first side of the paper tape and exits a second side of the paper tape.

17. The method of claim 13, wherein at least one of the first light source or the second light source emits about ten light pulses per second.

18. The method of claim 17, wherein at least one of the first light source or the second light source comprises a white light LED.

19. The method of claim 13, wherein at least one of the first light source or the second light source comprises an RBG LED.

* * * * *